United States Patent
Yan et al.

(10) Patent No.: US 12,180,123 B2
(45) Date of Patent: Dec. 31, 2024

(54) MULTILAYER ZIRCONIA CERAMIC BLOCK WITH UNIFORM TRANSITION AND METHOD FOR PREPARING THE SAME

(71) Applicant: ChengDu Besmile Medical Technology Corp. Ltd., Chengdu (CN)

(72) Inventors: Xinzhang Yan, Chengdu (CN); Youming Luo, Chengdu (CN); Moushan Liu, Chengdu (CN); Chongjing Feng, Chengdu (CN); Xiang Liao, Chengdu (CN); Shuai Liu, Chengdu (CN)

(73) Assignee: ChengDu Besmile Medical Technology Corp. Ltd., Chengdu (CN)

( * ) Notice: Subject to any disclaimer, the term of this patent is extended or adjusted under 35 U.S.C. 154(b) by 735 days.

(21) Appl. No.: 17/392,604

(22) Filed: Aug. 3, 2021

(65) Prior Publication Data
US 2021/0363068 A1 Nov. 25, 2021

Related U.S. Application Data

(63) Continuation of application No. PCT/CN2019/095170, filed on Jul. 9, 2019.

(51) Int. Cl.
| | |
|---|---|
| *C04B 41/00* | (2006.01) |
| *A61C 13/00* | (2006.01) |
| *A61C 13/08* | (2006.01) |
| *A61C 13/083* | (2006.01) |
| *C04B 35/48* | (2006.01) |
| *C04B 35/64* | (2006.01) |
| *C04B 35/645* | (2006.01) |
| *C04B 41/45* | (2006.01) |
| *C04B 41/50* | (2006.01) |
| *C04B 41/87* | (2006.01) |

(52) U.S. Cl.
CPC ........ *C04B 41/009* (2013.01); *A61C 13/0006* (2013.01); *A61C 13/0022* (2013.01); *A61C 13/082* (2013.01); *A61C 13/083* (2013.01); *C04B 35/48* (2013.01); *C04B 35/64* (2013.01); *C04B 35/645* (2013.01); *C04B 41/0081* (2013.01); *C04B 41/4578* (2013.01); *C04B 41/5068* (2013.01); *C04B 41/87* (2013.01); *C04B 2235/3225* (2013.01); *C04B 2235/3227* (2013.01); *C04B 2235/3244* (2013.01); *C04B 2235/5244* (2013.01); *C04B 2235/5276* (2013.01); *C04B 2235/604* (2013.01); *C04B 2235/6562* (2013.01); *C04B 2235/6565* (2013.01); *C04B 2235/6567* (2013.01); *C04B 2235/661* (2013.01); *C04B 2235/96* (2013.01)

(58) Field of Classification Search
CPC . C04B 35/48; C04B 41/5068; A61C 13/0006; A61C 3/0022; A61C 13/082; A61C 13/083; A61C 13/003
See application file for complete search history.

(56) References Cited

U.S. PATENT DOCUMENTS

| | | | |
|---|---|---|---|
| 4,278,630 A * | 7/1981 | Scheicher | A61C 13/0003 264/225 |
| 4,656,145 A | 4/1987 | Soroi | |
| 5,080,589 A * | 1/1992 | Oden | A61K 6/822 433/218 |
| 5,342,201 A * | 8/1994 | Oden | A61C 5/20 433/223 |
| 2004/0121291 A1* | 6/2004 | Knapp | A61C 13/0006 433/223 |
| 2008/0160193 A1* | 7/2008 | Mitchell | C23C 16/45525 427/255.19 |
| 2016/0015483 A1* | 1/2016 | Kumar | A61C 8/0006 606/301 |

FOREIGN PATENT DOCUMENTS

| | | |
|---|---|---|
| CN | 101857455 A | 10/2010 |
| CN | 106336216 A | 1/2017 |
| CN | 108220900 A | 6/2018 |

OTHER PUBLICATIONS

International Search Report; International Searching Authority/CN dated Apr. 15, 2020; International Application No. PCT/CN2019/095170; 4 pgs.; National Intellectual Property Administration, PRC (ISA/CN); Beijing, China.

* cited by examiner

*Primary Examiner* — Erin Snelting
(74) *Attorney, Agent, or Firm* — Andrew D. Fortney; Central California IP Group, P.C.

(57) ABSTRACT

The present disclosure belongs to the field of biological materials, and particularly relates to a multilayer zirconia ceramic with uniform transition and a method for preparing the same. The specific technical solution of the present disclosure is as follows: a zirconia ceramic with a formula comprising, in percentage by mass, 0-3% of lanthana, 1.5-16% of yttria, 0-2.5% of silicon carbide nano-whiskers, and 0-1.5% of a coloring agent, the balance being zirconia. Correspondingly provided are a multi-layer zirconia ceramic with uniform transition prepared using the formula and a method for preparing the same. By using the method of the present disclosure, multilayer zirconia ceramics with good and uniformly transitioning core properties can be quickly and conveniently prepared, meeting the requirements of patients with dental disorders on the use and esthetics of dentures.

19 Claims, No Drawings

MULTILAYER ZIRCONIA CERAMIC BLOCK WITH UNIFORM TRANSITION AND METHOD FOR PREPARING THE SAME

TECHNICAL FIELD

The present disclosure belongs to the field of biological materials, and particularly relates to a multilayer zirconia ceramic with a uniform transition and a method for preparing the same.

BACKGROUND

With the progress and development of the society and the diversification of the use of dental materials, zirconia ceramics have become more and more important in the dental industry due to their jade-like appearance and good mechanical properties. Nevertheless, with the improvement of people's living standard, the requirements on dentures made of zirconia ceramics are becoming higher and higher, requiring not only excellent mechanical properties but also good appearance. The light transmittance, gloss, flexural strength, and fracture toughness of the zirconia ceramic for dental use are affected by both the formula of the zirconia ceramic and the high-temperature sintering process mostly in a nonlinear manner. Therefore, so far, there is no any process that can prepare zirconia ceramics with both excellent mechanical properties and good appearance in the prior art. For those processes of the prior art, the natural color transition cannot be realized, or edge chipping and high scrap rate occur in machining or high-temperature sintering, or the mechanical properties of the finally obtained zirconia ceramic cannot meet the requirements, to name a few.

Therefore, it is of important practical significance to provide a zirconia ceramic with excellent and uniformly transitioning core properties such as mechanical properties, color and translucency, and a method for preparing the same.

SUMMARY

An objective of the present disclosure is to provide a multilayer zirconia ceramic with uniform transition and a method for preparing the same.

To achieve the above objective of the present disclosure, the technical solution adopted by the present disclosure is as follows: a zirconia ceramic, comprising, in percentages by mass, 0-3% of lanthana (i.e., lanthanum oxide, or $La_2O_3$), 1.5-16% of yttria (i.e., yttrium oxide, or $Y_2O_3$), 0-2.5% of silicon carbide nano-whiskers, and 0-1.5% of a coloring agent, the balance being zirconia (i.e., zirconium oxide, or $ZrO_2$).

Preferably, the zirconia ceramic includes both yttria and silicon carbide nano-whiskers, in a mass ratio of 1:1.

Preferably, the zirconia ceramic (which may be in the form of a block or other three-dimensional shape) includes a titanium nitride film on a surface thereof.

Correspondingly, a method for preparing a zirconia ceramic may comprise the following steps:
(1) weighing, in percentages by mass, 0-3% of lanthana, 1.5-16% of yttria, 0-2.5% of silicon carbide nano-whiskers, and zirconia as the balance, and mixing them to obtain a mixed powder;
(2) pre-pressing, isostatic pressing, and pre-sintering the mixed powder to obtain the zirconia ceramic;
(3) providing a titanium nitride film on a surface of the zirconia ceramic after pre-sintering is completed by cooling, cleaning, drying and coating the zirconia ceramic with Ti coating; and
(4) high-temperature sintering the Ti-coated zirconia ceramic in an $N_2$ atmosphere.

Preferably, before the Ti coating, the dried zirconia ceramic is sputtered (e.g., sputter-cleaned) using a low-energy ion beam, and then the zirconia ceramic is coated with Ti.

Preferably, the zirconia ceramic can also be processed into a zirconia ceramic with uniformly transitioning features. That is, a method for preparing a zirconia ceramic with a uniform transition may comprise preparing at least two different mixed powders, and laminating, isostatic pressing, and pre-sintering each of the mixed powders to form multilayer zirconia ceramics; and high-temperature sintering the mixed powders, wherein each of the mixed powders has a particle size distribution, an yttria content and a silicon carbide nano-whisker content such that the maximum difference in shrinkage of the zirconia ceramics during high-temperature sintering is <3‰.

Preferably, after pre-sintering, the zirconia ceramics are taken out (e.g., from a furnace) to cool before cleaning, drying and coating with Ti; and then the zirconia ceramics after the Ti coating are high-temperature sintered in the $N_2$ atmosphere.

Preferably, preparing the different mixed powders comprises:
(1) determining respective contents of raw material components in each of an uppermost layer and a lowermost layer of the zirconia ceramic (e.g., according to desired properties of the zirconia ceramic), wherein the layers of the zirconia ceramic include an uppermost layer, at least one transition layer and a lowermost layer;
(2) selecting the yttria content, the silicon carbide nano-whiskers content, and the particle size distribution of the mixed powders for the uppermost layer and the lowermost layer of the zirconia ceramic respectively such that the difference in shrinkage between the uppermost layer and the lowermost layer after high-temperature sintering is <3‰; and
(3) uniformly mixing parts of the mixed powders for each of the uppermost layer and the lowermost layer to obtain the at least one transition layer.

In the method, the uppermost layer, the at least one transition layer and the lowermost layer may be sequentially laminated, isostatically pressed, pre-sintered and high-temperature sintered to obtain the zirconia ceramic.

Preferably, the at least two different mixed powders provide one or more different colors, translucencies and/or mechanical properties to the uppermost layer and the lowermost layer.

Preferably, when the uppermost layer and the lowermost layer are different in color, the different mixed powders include a coloring agent in a percentage by mass of 0.1-1.5%; and/or when the uppermost layer and the lowermost layer are different in translucency, the percentage by mass of the yttria in the uppermost layer is greater than the percentage by mass of the yttria in the lowermost layer.

Preferably, the number of the transition layers is 2 to 5.

In one embodiment, the number of the transition layers is 5, and the 5 transition layers include the parts of the uppermost layer and the lowermost layer in respective mass ratios of 2:1, 3:2, 1:1, 2:3, and 1:2.

Preferably, high-temperature sintering comprises heating the different mixed powders from room temperature to 200° C. at a rate of 3-6° C./min, and holding at this temperature for 8-12 min; then heating the different mixed powders from 200° C. to 1000° C. at a rate of 8-25° C./min; heating the different mixed powders from 1000° C. to 1530° C. at a rate of 3-6° C./min, and holding at this temperature for 60-180 min; then cooling the different mixed powders from 1530° C. to 1200° C. or to 800° C. at a rate of 3-10° C./min; and cooling the different mixed powders to room temperature (e.g., along with the furnace in which the different mixed powders were heated).

Preferably, when preparing dentures with a 1-3 unit long bridge, heating the different mixed powders from 200° C. to 1000° C. is conducted at a rate of 16-25° C./min; and the different mixed powders are cooled from 1530° C. to 1200° C. at a rate of 6-10° C./min.

Preferably, when preparing dentures with a 4-7 unit long bridge, heating the different mixed powders from 200° C. to 1000° C. is conducted at a rate of 8-12° C./min; and the different mixed powders are cooled from 1530° C. to 1200° C. at a rate of 6-10° C./min.

Preferably, when preparing dentures with an 8-14 unit long bridge, heating the different mixed powders from 200° C. to 1000° C. is conducted at a rate of 8-12° C./min; and the different mixed powders are cooled from 1530° C. to 800° C. at a rate of 3-6° C./min.

The present disclosure has the follow beneficial effects:

1. People's teeth have a natural transition of color and translucency, so a certain transition of color and translucency is desired when the zirconia ceramic is processed into dentures. If a monolithic denture with the same color and translucency is installed, it will look incongruous. Therefore, the need for treating the color and translucency of dentures is very urgent. Generally, external coloring is used. Doing exactly the opposite, the present disclosure uses internal coloring/color masking, so that the zirconia ceramic obtained after sintering has naturally transitioning color and translucency, the internal and external colors of zirconia are consistent, and the thickness of the zirconia ceramic does not increase, unlike the external coloring/color masking method which increases the thickness of the zirconia ceramic and thus leads to inconsistency between the actual size and the estimated size of the denture. Therefore, the effect of the method of the present disclosure is obviously superior to the conventional coloring methods such as external brushing and soaking. In order to achieve the effect that the zirconia ceramic has naturally transitioning color and translucency, the present disclosure adopts pressing and sintering of a plurality of layers of different zirconia powders together. The present disclosure also provides a suitable zirconia powder formula for each of the light-colored end or layer and the dark-colored end or layer, where essentially the translucency of the zirconia ceramic is adjusted (or transitioned) by adjusting or changing the content of yttria (e.g., from lowermost or innermost layer to uppermost or outermost layer), and the color of the zirconia ceramic is adjusted (or transitioned) by adjusting or changing the type and the proportion of the coloring agent. The inventors have also found that when the content of the coloring agent is 1.5% or less, on the one hand, the color requirement of the zirconia ceramic can be ensured, and on the other hand, the influence on the shrinkage of the zirconia ceramic can be neglected.

The inventors also found that by adjusting the components in the formula, zirconia ceramics with different mechanical properties can be obtained. Zirconia ceramics with uniformly transitioning mechanical properties can be obtained by co-pressing and co-sintering of zirconia powder formulas with different mechanical properties. The difficulty lies in how to ensure that these formulas provide both desired color and translucency and desired mechanical properties. The inventors obtained the formula provided by the present disclosure after numerous experiments in the early stage, and the above requirements can be met simultaneously by utilizing the formula in conjunction with the specific preparation method in the present disclosure.

2. Zirconia powders with different formulas have different crystallization processes and thus different shrinkage behaviors when being sintered at high temperatures. When the different values of shrinkage exceed a certain range, the dental bridge will bend and deform, which may affect the esthetics at mild conditions, and may lead to scrapping and product failure at severe conditions.

In view of this problem, the inventors did not focus on how to reduce the shrinkage, but creatively proposed a new idea: how to adjust the layers to have consistent shrinkage. After a large number of preliminary studies, the inventors have found that in the zirconia powder formula verified by the inventors, the shrinkage of the zirconia ceramic is mainly controlled by the content of yttria in the formula and the particle size distributions of zirconia and yttria powders. Therefore, after a large number of experiments, the inventors obtained the relationship between the particle size distributions of zirconia and yttria and the shrinkage under specific yttria contents, and accordingly proposed a brand new technical solution: an appropriate shrinkage is selected according to actual needs (pre-calculated denture size and the like), and the particle size distributions of zirconia and yttria in each formula are adjusted according to the shrinkage, so that the overall shrinkage of zirconia ceramics is controlled to be consistent, thereby finally obtaining layered zirconia ceramics with naturally transitioning color, translucency and mechanical properties as well as consistent shrinkage.

3. In order to further ensure the final performance of the zirconia ceramic, starting with the sintering process, the inventors also provide a new and specific high-temperature sintering process. In the sintering process, the heating rate, the holding time and the cooling rate have the greatest influence on the finished product. Too fast heating rate easily leads to the problem that the ceramic has no time to shrink as a whole and is easy to deform; and the finished product is opaque and lusterless and has poor physical properties in all aspects. If the heating rate is too slow, the sintering cycle will be too long, which is not conducive to the preparation of the workpieces in a processing plant. If the holding time is too short, the finished products cannot be completely sintered, resulting in poor overall translucency and poor physical properties in various aspects. If the holding time is too long, the sintered zirconia grains will grow too large, and over-sintering will also occur, resulting in increased translucency and deteriorated physical properties of the finished product. If the holding time is not long enough, the sintering process will not be complete, and the samples will have more defects, poor translucency and large fluctuation in physical properties. If the cooling rate is too fast, the finished product will not shrink as a whole and concentrated internal stress will occur, and in serious cases, the ceramics will be fractured and broken. If the cooling rate is too slow, it will lead to the transformation of tetrahedron into syncline in the product phase, resulting in deteriorated physical properties. After a great deal of exploration, the inventors finally provide three sintering processes suitable for bridges of various sizes (e.g., with various numbers of teeth or units) based on the formula of the present disclosure.

DETAILED DESCRIPTION

An objective of the present disclosure is to provide a high-toughness zirconia ceramic with excellent mechanical properties and a method for preparing the same.

1. Formula of the High-Toughness Zirconia Ceramic

The zirconia ceramic provided by the present disclosure has a formula comprising, in percentage by mass, 0-3% of lanthana, 1.5-16% of yttria, and 0-2.5% of silicon carbide nano-whiskers, the balance being zirconia. The zirconia, lanthana and yttria are all nano-sized. Preferably, the zirconia ceramic is provided with a 100-200 nm thick titanium nitride film on the surface.

In the process of machining and high-temperature sintering, the zirconia ceramic is prone to edge chipping due to insufficient fracture toughness, leading to product scrapping. After the zirconia ceramic is prepared into dentures, the mechanical properties required by different positions of the denture are also different. The occlusal surface of the denture is in contact with other teeth and requires a relatively low hardness to avoid wear of the remaining teeth. Nevertheless, the mechanical properties can be modified according to different individualized requirements. For example, the mechanical properties at the occlusal surface close to the end face are required to be stronger to facilitate occlusion, and from the occlusal surface to the bottom end, the mechanical properties are weakened firstly and then gradually enhanced, so that the machining of the bridge is ensured.

The main factors affecting the mechanical properties are as follows. (1) Content of yttria: yttria as a stabilizer can inhibit the transformation of zirconia crystalline phase from tetragonal to monoclinic to a certain extent, thus helping to improve fracture toughness, but with limited effect. With other components of the formula being the same, compared with the case without yttria, incorporation of 1.5% of yttria can improve the fracture toughness; nevertheless, with the addition of yttria, the content of yttria has a negative correlation with the fracture toughness of zirconia ceramics. (2) Content of silicon carbide nano-whiskers: on one hand, the silicon carbide nano-whiskers can also inhibit the zirconia crystal from changing into a cubic phase, and on the other hand, the silicon carbide nano-whiskers have reinforcing effect on mechanical properties and can further improve the mechanical properties of the zirconia ceramic.

2. Method for Preparing the Zirconia Ceramic

When a titanium nitride protective film is not coated on the zirconia ceramic, the method for preparing the zirconia ceramic comprises the following steps: weighing all components except titanium nitride, uniformly mixing the components, and subjecting the mixture to pre-pressing, isostatic pressing, pre-sintering and high-temperature sintering to obtain the zirconia ceramic.

When the titanium nitride protective film is added, the preparation method is as follows:
(1) after pre-sintering is completed, machining the zirconia ceramic to the required or predetermined shape and size, and then subjecting the zirconia ceramic to ultrasonic cleaning with acetone and ethyl alcohol sequentially and drying;
(2) sputtering (i.e., sputter-cleaning) the cleaned zirconia ceramic using a low-energy ion beam;
(3) coating the zirconia ceramic with Ti using Ti particles with a purity of 99.99% in a vacuum environment under an Ar atmosphere, wherein the coating thickness is 100-150 nm; and
(4) high-temperature sintering the zirconia ceramic with the Ti coating in an $N_2$ atmosphere, and after sintering, taking out the zirconia ceramic, cooling it down, and subjecting it to ultrasonic cleaning with acetone and ethyl alcohol sequentially, and drying to obtain the finished product.

Another objective of the present disclosure is to, based on the formula of the above high-toughness zirconia ceramic, provide a multilayer zirconia ceramic with uniform transition of mechanical properties, color and translucency, and a process for preparing the same.

The human teeth are not exactly the same color, and there is a certain color transition. Different colors correspond to different zirconia powder formulas. The content of colored oxides in the formula is generally less than 1.5%, which has negligible effect on the sintering shrinkage of the zirconia ceramic.

The core of the method provided by the present disclosure is to make all the layers of the zirconia ceramic have consistent shrinkage by adjusting or selecting the particle size distribution of the powder in the powder formulas, and adjusting or controlling the content of yttria in the formulas, so that the layers of the zirconia ceramic shrink similarly during sintering, thereby finally obtaining zirconia ceramics with consistent shrinkage and no bending deformation. Specifically, the method comprises the following steps.

(1) Determining the content of each component in different powder formulas of each layer of the zirconia ceramic according to the desired or predetermined properties.

First, the property to be transitioned is determined (for example, mechanical properties, color, or translucency). For ease of illustration, the uppermost layer and the lowermost layer are used to represent the two layers of powder formulas with the greatest difference (e.g., in color, translucency, mechanical properties, and/or performance). Here take color and translucency as an example. The uppermost layer is the layer with the lightest color or translucency, and the lowermost layer is the layer with the darkest color or translucency.

The formula of zirconia powder of each of the lightest layer and the darkest layer is firstly determined. By mass, the overall formula of the zirconia powder still takes zirconia as a main component and yttria as an auxiliary component, and a coloring agent with a mass fraction less than 1.5% is additionally added. If better mechanical properties are required, a certain amount of silicon carbide nano-whiskers can be added, and a titanium nitride film can be additionally formed on the surface.

(2) Based on the content of yttria in each formula, the particle size distribution of powder in the formula of each of the lightest layer and the darkest layer is adjusted or selected so as to ensure that the powder formulas of the two layers have a consistent shrinkage after sintering.

(3) A transition layer is provided according to the formulas of the two layers of powder. Under the condition that other conditions are exactly the same and only the content of the silicon carbide nano-whiskers, the content of the yttria and/or the content of the coloring agent are different, there may be a significant difference in color and translucency between the lightest layer and the darkest layer; mechanical properties may also be significantly different, and chipping may easily occur at the interface between the two layers. If two layers of different powder materials are only simply put together and pressed and sintered, an obvious discontinuity will occur in translucency, color and/or mechanical properties, failing to meet the requirements on esthetics and normal use. In order to solve the problem of discontinuity, a preferred solution is to arrange one or more (e.g., several) transition layers between the lightest and darkest layers. The transition layer is obtained by mixing the lightest layer and the darkest layer in a certain ratio. Generally, 2 to 5 transition layers are present.

(4) After all of the layers are placed layer by layer on the preceding layer according to the sequence of required color depth and the like, they are subjected to isostatic pressing and then pre-sintering, followed by turning shaping, engraving and milling/slicing according to conventional processes, and then high-temperature sintering is carried out to obtain the finished product.

It should be understood that the multilayer zirconia ceramic is provided to achieve a uniform transition of the relevant properties. The specific property to be transitioned is determined according to actual needs and can be one or more mechanical properties, color and/or translucency. For example, with the content of the silicon carbide nano-whiskers in the powder of each layer kept unchanged, the uniform transition of translucency and color can be realized by adjusting the content of yttria and the coloring agent. Also, with the content of yttria and the coloring agent kept unchanged, the uniform transition of mechanical properties can be realized by adjusting the content of silicon carbide nano-whiskers in the powder. Alternatively, silicon carbide nano-whiskers can be absent, and only the content of yttria or the coloring agent is regulated; or the contents of the three can be simultaneously adjusted to obtain multilayer zirconia ceramics with a natural transition in mechanical properties, color and translucency. Use of the method for realizing the consistent shrinkage of the multilayer zirconia ceramic by adjusting or selecting an appropriate or predetermined particle size distribution in the zirconia powder formula, and the zirconia ceramic with uniform transitions between layers obtained by the method are all within the protection range of the present disclosure.

The present disclosure also provides a high-efficiency high-temperature sintering process for preparing the high-toughness zirconia ceramic and the multilayer zirconia ceramic.

After zirconia formula determination, weighing of raw materials, uniform mixing, pre-pressing, isostatic pressing, pre-sintering and machining (engraving and milling), the final high-temperature sintering step should be carried out to obtain the finished zirconia ceramic. The formula composition itself is the decisive factor affecting the mechanical properties, translucency and other core properties of the zirconia ceramic. Nevertheless, within the above general formula, when using a formula with a certain value completely confirmed, the specific process of high-temperature sintering has a great influence on the performance of the zirconia ceramic. In the sintering process, the heating rate, the holding time and the cooling rate have the greatest influence on the final zirconia ceramics. The present disclosure provides a process capable of completing sintering as efficiently as possible while ensuring mechanical properties and translucency. In addition, dentures with bridges of different number of units (e.g., teeth) have different requirements for mechanical properties, and correspondingly require different sintering processes. Too fast a heating rate and a cooling rate can directly lead to non-uniform sintering, distortion and deformation of the zirconia ceramic, and the like, but a too slow rate will seriously affect the efficiency and increase the manufacturing cost. The sintering process provided by the present disclosure may comprise the following steps.

1. Preparation of a 1-3 unit long bridge (the number of units of a bridge refers to the number of teeth in the bridge, and the higher the number, the higher the requirement on mechanical properties; for example, a 3 unit long bridge means that there are three teeth on the bridge): (1) heating the teeth or bridge from room temperature to 200° C. at a rate of 3-6° C./min, and holding at this temperature for 8-12 min; (2) heating the teeth or bridge from 200° C. to 1000° C. at a rate of 16-25° C./min; (3) heating the teeth or bridge from 1000° C. to 1530° C. at a rate of 3-6° C./min, and holding at this temperature for 60-180 min; (4) controlling the furnace temperature to cool the teeth or bridge from 1530° C. to 1200° C. at a rate of 6-10° C./min; and (5) finally cooling the teeth or bridge (e.g., naturally) to room temperature. In some embodiments, the teeth or bridge are cooled to room temperature in the furnace. The total sintering time is controlled to be 288-378 min.

A preferred process is as follows: (1) heating the teeth or bridge from 50° C. to 200° C. at a rate of 5° C./min, and holding at this temperature for 10 min; (2) heating the teeth or bridge from 200° C. to 1000° C. at a rate of 20° C./min; (3) heating the teeth or bridge from 1000° C. to 1530° C. at a rate of 5° C./min, and holding at this temperature for 60-180 min; (4) controlling the furnace temperature to cool the teeth or bridge from 1530° C. to 1200° C. at a rate of 8° C./min; and (5) finally naturally cooling the teeth or bridge to room temperature along with (i.e., in) the furnace, for example by turning off the heating element of the furnace.

2. Preparation of a 4-7 unit long bridge: (1) heating the teeth or bridge from 50° C. to 200° C. at a rate of 3-6° C./min, and holding at this temperature for 8-12 min; (2) heating the teeth or bridge from 200° C. to 1000° C. at a rate of 8-12° C./min; (3) heating the teeth or bridge from 1000° C. to 1530° C. at a rate of 3-6° C./min, and holding at this temperature for 60-180 min; (4) controlling the furnace temperature to cool the teeth or bridge from 1530° C. to 1200° C. at a rate of 6-10° C./min; and (5) finally naturally cooling the teeth or bridge to room temperature along with the furnace. The total sintering time is controlled to be 328-418 min.

A preferred process is as follows: (1) heating the teeth or bridge from 50° C. to 200° C. at a rate of 5° C./min, and holding at this temperature for 10 min; (2) heating the teeth or bridge from 200° C. to 1000° C. at a rate of 10° C./min; (3) heating the teeth or bridge from 1000° C. to 1530° C. at a rate of 5° C./min, and holding at this temperature for 60-180 min; (4) controlling the furnace temperature to cool the teeth or bridge from 1530° C. to 1200° C. at a rate of 8° C./min; and (5) finally naturally cooling the teeth or bridge to room temperature along with the furnace.

3. Preparation of an 8-14 unit long bridge: (1) heating the teeth or bridge from 50° C. to 200° C. at a rate of 3-6° C./min, and holding at this temperature for 8-12 min; (2) heating the teeth or bridge from 200° C. to 1000° C. at a rate of 8-12° C./min; (3) heating the teeth or bridge from 1000° C. to 1530° C. at a rate of 3-6° C./min, and holding at this temperature for 60-180 min; (4) controlling the furnace temperature to cool the teeth or bridge from 1530° C. to 800° C. at a rate of 3-6° C./min; and (5) finally naturally cooling the teeth or bridge to room temperature along with the furnace. The total sintering time is controlled to be 432-522 min.

A preferred process is as follows: (1) heating the teeth or bridge from 50° C. to 200° C. at a rate of 5° C./min, and holding at this temperature for 10 min; (2) heating the teeth or bridge from 200° C. to 1000° C. at a rate of 10° C./min; (3) heating the teeth or bridge from 1000° C. to 1530° C. at a rate of 5° C./min, and holding at this temperature for 60-180 min; (4) controlling the temperature of the furnace to cool the teeth or bridge from 1530° C. to 800° C. at a rate of 5° C./min; and (5) finally naturally cooling the teeth or bridge to room temperature along with the furnace.

The technical solution of the present disclosure is further explained below with reference to specific examples.

Example 1: Performance Demonstration of High Toughness Zirconia Ceramic without Titanium Nitride Coating 1. 39 groups of zirconia ceramic blocks were prepared according to the above formula of the high-toughness zirconia ceramics, with 20 replicates for each group. The specific formula of each group of zirconia ceramic blocks is shown in Table 1, with the values in the table being mass fractions (i.e., percentages by mass), and the balance being zirconia powder. ST zirconia blocks purchased from Changsha Pengdeng Biological Block Co., Ltd. were used as the control group. It should be noted that the applicants did not only conduct the test in Table 1, but only selected the most representative sets of data for presentation due to space limitations.

Specifically, each group of zirconia ceramic blocks were prepared as follows. The components were weighed, well mixed, held at 150 MPa for 10 min for isostatic pressing, and then held at 1050° C. for 2 h for pre-sintering. Ten replicates were taken out from each group and machined to the shape and size of teeth for dentures. The other 10 replicates from each group were not machined. Subsequently, all the replicates of each group were held at 1530° C. for 2 h for high-temperature sintering to complete the preparation (the high-temperature sintering was continuously carried out on the replicate zirconia ceramic blocks of each group, whether edge chipping occurred or not during the machining process).

TABLE 1

Formulas of zirconia ceramics in all the groups

| Group | Yttria | Lanthana | Silicon carbide nano-whiskers |
|---|---|---|---|
| Group 1 | 1.5 | 0.5 | 0 |
| Group 2 | 2.5 | 0.5 | 0 |
| Group 3 | 3.5 | 0.5 | 0 |
| Group 4 | 4.5 | 0.5 | 0 |
| Group 5 | 7.5 | 0.5 | 0 |
| Group 6 | 12.0 | 0.5 | 0 |
| Group 7 | 1.5 | 0.5 | 0.5 |
| Group 8 | 2.5 | 0.5 | 0.5 |
| Group 9 | 3.5 | 0.5 | 0.5 |
| Group 10 | 4.5 | 0.5 | 0.5 |
| Group 11 | 7.5 | 0.5 | 0.5 |
| Group 12 | 12.0 | 0.5 | 0.5 |
| Group 13 | 1.5 | 0.5 | 1 |
| Group 14 | 2.5 | 0.5 | 1 |
| Group 15 | 3.5 | 0.5 | 1 |
| Group 16 | 4.5 | 0.5 | 1 |
| Group 17 | 7.5 | 0.5 | 1 |
| Group 18 | 12.0 | 0.5 | 1 |
| Group 19 | 1.5 | 0.5 | 1.5 |
| Group 20 | 2.5 | 0.5 | 1.5 |
| Group 21 | 3.5 | 0.5 | 1.5 |
| Group 22 | 4.5 | 0.5 | 1.5 |
| Group 23 | 7.5 | 0.5 | 1.5 |
| Group 24 | 12.0 | 0.5 | 1.5 |
| Group 25 | 1.5 | 0.5 | 2 |
| Group 26 | 2.5 | 0.5 | 2 |
| Group 27 | 3.5 | 0.5 | 2 |
| Group 28 | 4.5 | 0.5 | 2 |
| Group 29 | 7.5 | 0.5 | 2 |
| Group 30 | 12.0 | 0.5 | 2 |
| Group 31 | 1.5 | 0.5 | 2.5 |
| Group 32 | 2.5 | 0.5 | 2.5 |
| Group 33 | 3.5 | 0.5 | 2.5 |
| Group 34 | 4.5 | 0.5 | 2.5 |
| Group 35 | 7.5 | 0.5 | 2.5 |
| Group 36 | 12.0 | 0.5 | 2.5 |
| Group 37 | 5.5 | 0 | 1.5 |
| Group 38 | 5.5 | 1 | 1.5 |
| Group 39 | 5.5 | 3 | 1.5 |

2. The edge chipping rate of the replicates in each group was determined using the indentation method, wherein the edge chipping which has occurred in the machining is not included in the edge chipping that occurs in the high-temperature sintering, and the edge chipping rate in the high-temperature sintering only calculates the number and the percentage in the whole group of the zirconia ceramics which have edge chipping in the high-temperature sintering process. Also, the fracture toughness and the light transmittance of each group were calculated, wherein the light transmittance was averaged over 20 replicates in each group and the fracture toughness of the end product was averaged over the un-machined zirconia blocks in each group. The results are shown in Table 2.

TABLE 2

Performance of zirconia ceramics in all the groups

| Group | Edge chipping rate in machining (%) | Edge chipping rate (%) of machined ceramics in high-temperature sintering | Edge chipping rate (%) of un-machined ceramics in high-temperature sintering | Fracture toughness of end product (MPa·m$^{1/2}$) | Light transmittance of ceramic (%) |
|---|---|---|---|---|---|
| Group 1 | 0 | 30% | 10% | 10.57 | 37.74 |
| Group 2 | 10% | 30% | 10% | 10.13 | 39.78 |
| Group 3 | 10% | 30% | 20% | 9.77 | 41.82 |
| Group 4 | 10% | 30% | 10% | 9.38 | 42.84 |
| Group 5 | 10% | 50% | 30% | 8.58 | 43.86 |
| Group 6 | 30% | 50% | 40% | 7.74 | 46.92 |
| Group 7 | 0 | 10% | 10% | 16.81 | 38.66 |
| Group 8 | 10% | 20% | 10% | 16.37 | 40.29 |
| Group 9 | 10% | 20% | 10% | 16.01 | 42.33 |
| Group 10 | 10% | 20% | 10% | 15.62 | 43.35 |

TABLE 2-continued

Performance of zirconia ceramics in all the groups

| Group | Edge chipping rate in machining (%) | Edge chipping rate (%) of machined ceramics in high-temperature sintering | Edge chipping rate (%) of un-machined ceramics in high-temperature sintering | Fracture toughness of end product (MPa·m$^{1/2}$) | Light transmittance of ceramic (%) |
|---|---|---|---|---|---|
| Group 11 | 30% | 20% | 10% | 14.82 | 44.37 |
| Group 12 | 40% | 30% | 30% | 13.98 | 47.43 |
| Group 13 | 0 | 10% | 10% | 17.25 | 39.68 |
| Group 14 | 0 | 10% | 10% | 16.81 | 41.21 |
| Group 15 | 0 | 20% | 10% | 16.45 | 43.04 |
| Group 16 | 0 | 20% | 10% | 16.05 | 44.06 |
| Group 17 | 10% | 30% | 10% | 15.26 | 45.08 |
| Group 18 | 20% | 30% | 20% | 14.42 | 48.14 |
| Group 19 | 0 | 0 | 0 | 18.48 | 50.72 |
| Group 20 | 0 | 0 | 0 | 18.04 | 44.13 |
| Group 21 | 0 | 0 | 0 | 17.69 | 44.66 |
| Group 22 | 0 | 10% | 0 | 17.29 | 44.98 |
| Group 23 | 10% | 20% | 10% | 16.49 | 46.00 |
| Group 24 | 10% | 30% | 20% | 15.66 | 49.06 |
| Group 25 | 0 | 10% | 0 | 17.89 | 40.70 |
| Group 26 | 0 | 10% | 10% | 17.45 | 41.51 |
| Group 27 | 0 | 20% | 10% | 17.09 | 42.94 |
| Group 28 | 10% | 30% | 10% | 16.69 | 43.96 |
| Group 29 | 20% | 20% | 10% | 15.89 | 44.98 |
| Group 30 | 10% | 30% | 20% | 15.06 | 48.04 |
| Group 31 | 0 | 10% | 10% | 17.25 | 39.98 |
| Group 32 | 10% | 20% | 10% | 16.81 | 41.41 |
| Group 33 | 10% | 30% | 10% | 16.45 | 42.43 |
| Group 34 | 20% | 30% | 10% | 16.05 | 43.45 |
| Group 35 | 30% | 30% | 10% | 15.26 | 46.51 |
| Group 36 | 30% | 30% | 20% | 14.42 | 38.45 |
| Group 37 | 10% | 30% | 10% | 16.53 | 45.18 |
| Group 38 | 10% | 20% | 10% | 16.01 | 44.03 |
| Group 39 | 10% | 30% | 10% | 15.29 | 40.18 |
| control group | 30% | 60% | 40% | 7.13 | 42.19 |

Example 2: Performance Demonstration of High Toughness Zirconia Ceramic Coated with Titanium Nitride 1. Twenty groups of zirconia ceramic blocks with the formula of group 19 of Example 1 were prepared. After pre-sintering in the same way as in Example 1, 10 groups of zirconia ceramic blocks were taken out and machined to the required shape and size of the dentures, while the other 10 groups were not machined. Subsequently, each group of zirconia ceramic blocks were sequentially soaked in acetone and anhydrous ethanol for ultrasonic cleaning and drying.

2. Each group of zirconia ceramic blocks were sputter cleaned using a low-energy ion beam. The specific sputter cleaning conditions were as follows: the zirconia ceramic blocks were sputtered for 5 min using a low-energy ion beam of 300 eV and 50 mA.

3. Ti coating was carried out on the sputter-cleaned zirconia ceramic block using an electron beam evaporation coating machine. With a vacuum degree controlled at 6×10$^{-4}$ Pa, and an electron beam current of 100 mA, 7 kV, the zirconia ceramic block was coated with 99.99% pure Ti particles in an Ar atmosphere. The thickness of the coating was monitored by FCM-II film thickness controller. The thickness of the coating was 100 nm.

4. The zirconia ceramics with the Ti coating were sintered in an N$_2$ atmosphere at a high temperature of 1530° C. with a 2 h hold. After the sintering was completed, the zirconia ceramics with the TiN coating were taken out, cooled down, and subjected to ultrasonic cleaning with acetone and alcohol sequentially and drying to obtain the zirconia ceramics of each experimental group.

At the same time, with step 2 (sputtering) omitted, a control group was provided. After the preparation was completed, the surface of the zirconia ceramic blocks in the control group and the experimental groups was repeatedly scratched with force using the blade tip. In the control group, the surface film showed scratches, and after being scratched about 5 times at the same position, the film became warped and peeled off. In the experimental groups (one zirconia ceramic block was randomly selected from each of the machined and un-machined groups), the films were bonded tightly, and had no scratch, edge warping or spalling when scratched more than 20 times at the same position.

These groups of zirconia ceramics were subjected to performance testing using the same method as in Example 1. No edge chipping and fracture occurred during machining. The zirconia ceramics of both the machined groups and un-machined groups were sintered at high temperatures, and no edge chipping and fracture and other conditions appeared. The average fracture toughness of the machined zirconia ceramics and that of the un-machined ones were determined respectively. The translucency of all the experimental groups was measured and the average value was taken. With machining, the average fracture toughness was 19.83 MPa·m$^{1/2}$, while without machining, the average fracture toughness was 20.11 MPa·m$^{1/2}$. The average translucency was 48.53%. The fracture toughness was significantly improved and the translucency held up compared with the commercially available products and Example 1.

Example 3: Performance Demonstration of Multilayer Zirconia Ceramics without Silicon Carbide Nano-Whiskers 1. The zirconia powder formula for each of the lightest layer and the darkest layer was set. The zirconia powder used in this example was purchased from Shanghai Linghao Metal Material Co., Ltd., with Art. No. ZR-2.

Without silicon carbide nano-whiskers, the lightest layer formula comprises, in percentages by mass, 85-95% of zirconia powder, 4-15% of yttria powder and 0.3-0.4% of coloring agent. The darkest layer formula comprises 92-97% of zirconia powder, 3-7% of yttria powder and 0.5-0.6% of coloring agent. It has been found through a large number of preliminary tests that a preferred solution includes a content (mass fraction) of yttria in the zirconia powder for the lightest layer of preferably 4-5%; and the content of yttria for the darkest layer is preferably 3-4%.

In this example, the lightest layer formula comprises, by mass, 94.7% of zirconia powder, 5% of yttria powder, and 0.3% of coloring agent. The darkest layer formula comprises, by mass, 96.5% of zirconia powder, 3% of yttria powder, and 0.5% of coloring agent. The coloring agent can be one or a mixture of two or more of erbium chloride, ferric chloride, neodymium nitrate, manganese nitrate, ammonium metavanadate, cerium nitrate, praseodymium nitrate, cobalt nitrate and nickel nitrate. For convenient operation, all of the examples of the present disclosure use the same coloring agent (which provides a tetracycline ash color), obtained by mixing erbium chloride, ferric chloride and manganese nitrate in a mass ratio of 6:1:2.

2. Monolithic zirconia ceramics were manufactured according to the above formulas, and the shrinkage of the zirconia ceramics with the same formula but different particle size distributions of zirconia and yttria was measured. With the same formula, the particle size distributions of zirconia and yttria in the formula were varied, and the shrinkage under each particle size distribution was measured after isostatic pressing, pre-sintering and high-temperature sintering under the same conditions. The isostatic pressing was carried out at 150 MPa with a 10 min hold, the pre-sintering at 1050° C. with a 2 h hold, and the high-temperature sintering at 1530° C. with a 2 h hold. Under different particle size distributions, the shrinkage of zirconia ceramics prepared with the lightest layer formula is shown in Table 3; and the shrinkage of zirconia ceramics prepared with the darkest layer formula is shown in Table 4.

TABLE 3

Shrinkage of the lightest layer formula

| Powder particle size | 10-50 μm | 50-150 μm | 150-300 μm | Shrinkage (%) |
|---|---|---|---|---|
| Content of powders with different particle sizes (%) | 70 | 20 | 10 | 16.67 |
| | 60 | 30 | 10 | 17.01 |
| | 50 | 40 | 10 | 17.36 |
| | 40 | 50 | 10 | 17.70 |
| | 30 | 60 | 10 | 18.03 |
| | 20 | 70 | 10 | 18.37 |
| | 10 | 80 | 10 | 18.70 |
| | 65 | 15 | 20 | 17.70 |
| | 55 | 25 | 20 | 18.03 |
| | 45 | 35 | 20 | 18.37 |
| | 35 | 45 | 20 | 18.70 |

TABLE 3-continued

Shrinkage of the lightest layer formula

| Powder particle size | 10-50 μm | 50-150 μm | 150-300 μm | Shrinkage (%) |
|---|---|---|---|---|
| | 25 | 55 | 20 | 19.03 |
| | 15 | 65 | 20 | 19.35 |
| | 60 | 10 | 30 | 18.70 |
| | 50 | 20 | 30 | 19.03 |
| | 40 | 30 | 30 | 19.35 |
| | 30 | 40 | 30 | 19.68 |
| | 20 | 50 | 30 | 20.00 |
| | 10 | 60 | 30 | 20.32 |
| | 50 | 10 | 40 | 19.35 |
| | 40 | 20 | 40 | 19.68 |
| | 30 | 30 | 40 | 20.00 |
| | 20 | 40 | 40 | 20.32 |
| | 10 | 50 | 40 | 20.63 |

TABLE 4

Shrinkage of the darkest layer formula

| Powder particle size | 10-50 μm | 50-150 μm | 150-300 μm | Shrinkage (%) |
|---|---|---|---|---|
| Content of powders with different particle sizes (%) | 70 | 20 | 10 | 17.36 |
| | 60 | 30 | 10 | 17.70 |
| | 50 | 40 | 10 | 18.03 |
| | 40 | 50 | 10 | 18.37 |
| | 30 | 60 | 10 | 18.70 |
| | 20 | 70 | 10 | 19.03 |
| | 10 | 80 | 10 | 19.35 |
| | 65 | 15 | 20 | 18.50 |
| | 55 | 25 | 20 | 18.83 |
| | 45 | 35 | 20 | 19.16 |
| | 35 | 45 | 20 | 19.48 |
| | 25 | 55 | 20 | 19.81 |
| | 15 | 65 | 20 | 20.13 |
| | 60 | 10 | 30 | 19.29 |
| | 50 | 20 | 30 | 19.61 |
| | 40 | 30 | 30 | 19.94 |
| | 30 | 40 | 30 | 20.26 |
| | 20 | 50 | 30 | 20.57 |
| | 10 | 60 | 30 | 20.89 |
| | 50 | 10 | 40 | 19.81 |
| | 40 | 20 | 40 | 20.13 |
| | 30 | 30 | 40 | 20.45 |
| | 20 | 40 | 40 | 20.76 |
| | 10 | 50 | 40 | 21.07 |

3. The lightest layer formula and the darkest layer formula were adjusted to have consistent shrinkage. The particle size distributions with the same shrinkage of 17.70%, 18.70%, 19.03% and 19.35% were selected to prepare four groups (namely, groups 1, 2, 3 and 4) of zirconia ceramics according to the method of layered zirconia ceramics respectively, with three replicates for each group. Take the shrinkage of 17.70% as an example. That is, in the lightest layer formula, the particle size distributions of zirconia and yttria were as follows: 10-50 μm, accounting for 40%; 50-150 μm, accounting for 50%; and 150-300 μm, accounting for 10%. In the darkest layer formula, the particle size distributions of zirconia and yttria were as follows: 10-50 μm, accounting for 60%; 50-150 μm, accounting for 30%; and 150-300 μm, accounting for 10%. The particle size distributions in the remaining groups are similar.

4. The formula of the transition layer was determined according to the lightest layer formula and darkest layer formula. The mass ratios of these transition layers were 2:1, 3:2, 1:1, 2:3 and 1:2 of the lightest layer to the darkest layer, respectively, and the lightest layer formula and the darkest layer formula were uniformly mixed to obtain transition layer formulas 1, 2, 3, 4 and 5, respectively. Because the maximum difference in shrinkage between the lightest layer and the darkest layer was determined, the difference in sintering shrinkage between the prepared transition layers and each of the lightest layer and the darkest layer cannot exceed the determined values, thereby ensuring consistent shrinkage of the finally obtained layered zirconia ceramic.

5. The various layers of powder materials were sequentially placed or deposited in the order of the lightest layer, the transition layer 1, the transition layer 2, the transition layer 3, the transition layer 4, the transition layer 5 and the darkest layer, and isostatic pressing, pre-sintering and high-temperature sintering were carried out according to the method of step 2 to obtain the zirconia ceramics of each group. The difference in shrinkage between zirconia ceramics was measured, and transition of translucency and color was visually observed. Meanwhile, using the method of step 2, four groups of light-colored monolithic zirconia ceramics and four groups of dark-colored monolithic zirconia ceramics were prepared according to the formulas and particle size distributions of groups 1, 2, 3 and 4, respectively. The light transmittance of each group of the light-colored zirconia ceramics and the dark-colored zirconia ceramics was detected, and the three-point flexural strength of each group of the light-colored zirconia ceramics was detected (with reference to GB30356-2013). The results are shown in Table 5.

mixing erbium chloride, iron chloride, and manganese nitrate in a mass ratio of 6:1:2. It should be noted that the applicant not only conducted the tests in Table 6, but only selected the most representative sets of data for presentation due to space limitations.

Specifically, each group of zirconia ceramics were prepared as follows. The components were weighed, well mixed, held at 150 MPa for 10 min for isostatic pressing, and then held at 1050° C. for 2 h for pre-sintering. Ten replicates were taken out from each group and machined to the shape and size of dentures. The other 10 replicates from each group were not machined. Then, high-temperature sintering was carried out on the replicates in each group to complete the preparation (the high-temperature sintering was continuously carried out on the replicate zirconia ceramics of each group whether edge chipping occurred or not during the machining process). The specific process of the high-temperature sintering comprises: heating up from 50° C. to 200° C. at a rate of 5° C./min, and holding at this temperature for 10 min; then heating up from 200° C. to 1000° C. at a rate of 10° C./min; then heating up from 1000° C. to 1530° C. at a rate of 5° C./min for 120 min; then cooling down from 1530° C. to 800° C. at a rate of 5° C./min along with the furnace; and finally naturally cooling down to room temperature.

TABLE 5

Effects of all the groups

| Group | Maximum shrinkage difference | Appearance | Light transmittance of light-colored zirconia ceramic | Light transmittance of dark-colored zirconia ceramic | Flexural strength of light-colored zirconia ceramic |
|---|---|---|---|---|---|
| Group 1 | <1‰ | Uniform transition, no discontinuity in translucency and color | 40.12% | 33.13% | 1325 MPa |
| Group 2 | <2‰ | Uniform transition, no discontinuity in translucency and color | 38.25% | 31.54% | 1280 MPa |
| Group 3 | <3‰ | Uniform transition, no discontinuity in translucency and color | 37.01% | 30.05% | 1291 MPa |
| Group 4 | <2‰ | Uniform transition, no discontinuity in translucency and color | 37.23% | 29.98% | 1278 MPa |

Example 4: Performance Demonstration of Multilayer Zirconia Ceramics with Silicon Carbide Nano-Whiskers 1. Thirty-five groups of monolithic zirconia ceramics were prepared, with 20 replicates for each group. The specific formula of each group of zirconia ceramics is shown in Table 6, wherein the values in the table are all mass fractions (i.e., percentages by mass), and the balance is zirconia powder. The content of coloring agent in each group of zirconia ceramics is 0.4%. The coloring agent may be any one or a mixture of two or more of erbium chloride, iron chloride, neodymium nitrate, manganese nitrate, ammonium metavanadate, cerium nitrate, praseodymium nitrate, cobalt nitrate and nickel nitrate. For convenience of operation, all the examples of the present disclosure use the same coloring agent (providing a tetracycline gray color) obtained by

TABLE 6

Formulas of zirconia ceramics in all the groups

| Group | Yttria | Silicon carbide nano-whiskers |
|---|---|---|
| Group 1 | 0 | 0 |
| Group 2 | 1.5 | 0 |
| Group 3 | 2.5 | 0 |
| Group 4 | 3.5 | 0 |
| Group 5 | 4.5 | 0 |
| Group 6 | 7.5 | 0 |
| Group 7 | 12.0 | 0 |
| Group 8 | 0 | 0.5 |
| Group 9 | 1.5 | 0.5 |
| Group 10 | 2.5 | 0.5 |
| Group 11 | 3.5 | 0.5 |
| Group 12 | 4.5 | 0.5 |
| Group 13 | 7.5 | 0.5 |

TABLE 6-continued

Formulas of zirconia ceramics in all the groups

| Group | Yttria | Silicon carbide nano-whiskers |
|---|---|---|
| Group 14 | 12.0 | 0.5 |
| Group 15 | 0 | 1 |
| Group 16 | 1.5 | 1 |
| Group 17 | 2.5 | 1 |
| Group 18 | 3.5 | 1 |
| Group 19 | 4.5 | 1 |
| Group 20 | 7.5 | 1 |
| Group 21 | 12.0 | 1 |
| Group 22 | 0 | 1.5 |
| Group 23 | 1.5 | 1.5 |
| Group 24 | 2.5 | 1.5 |
| Group 25 | 3.5 | 1.5 |
| Group 26 | 4.5 | 1.5 |
| Group 27 | 7.5 | 1.5 |
| Group 28 | 12.0 | 1.5 |
| Group 29 | 0 | 2 |
| Group 30 | 1.5 | 2 |
| Group 31 | 2.5 | 2 |
| Group 32 | 3.5 | 2 |
| Group 33 | 4.5 | 2 |
| Group 34 | 7.5 | 2 |
| Group 35 | 12.0 | 2 |

Of course, in this step, with reference to the method of Example 2, the zirconia ceramics in each group can be taken out after the pre-sintering, and subjected to Ti coating and then high-temperature sintering in an $N_2$ atmosphere to further improve fracture toughness. Due to space limitations, details thereof are not repeated here.

2. The edge chipping rate of the replicates in each group was detected using the indentation method, wherein the edge chipping which has occurred in the machining is not included the edge chipping in the high-temperature sintering, and the edge chipping rate in the high-temperature sintering only calculates the number of the zirconia ceramics with edge chipping in the high-temperature sintering process and its corresponding percentage in the whole group. Meanwhile, the three-point flexural strength (with reference to GB30356-2013), fracture toughness and light transmittance of each group were calculated, wherein the light transmittance was averaged over the 20 replicates in each group, and the flexural strength and fracture toughness of the end product were averaged over un-machined zirconia ceramics in each group. The results are shown in Table 7.

TABLE 7

Performance of zirconia ceramics in all the groups

| Group | Edge chipping rate in machining | Edge chipping rate (%) of machined ceramic in high-temperature sintering | Edge chipping rate (%) of un-machined ceramic in high-temperature sintering | Fracture toughness MPa·$m^{1/2}$ | Light transmittance (%) | Flexural strength MPa |
|---|---|---|---|---|---|---|
| Group 1 | 50% | 40% | 30% | 6.33 | 29.08 | 986 |
| Group 2 | 0 | 30% | 10% | 10.43 | 37.56 | 1102 |
| Group 3 | 10% | 30% | 10% | 10.02 | 40.01 | 1099 |
| Group 4 | 10% | 30% | 20% | 10.05 | 41.67 | 1086 |
| Group 5 | 10% | 30% | 10% | 9.38 | 42.84 | 1021 |
| Group 6 | 10% | 50% | 30% | 8.61 | 44.01 | 1005 |
| Group 7 | 30% | 50% | 40% | 7.81 | 47.03 | 993 |
| Group 8 | 0 | 20% | 10% | 13.51 | 36.00 | 1189 |
| Group 9 | 0 | 10% | 0 | 16.73 | 38.54 | 1247 |
| Group 10 | 10% | 20% | 0 | 16.30 | 41.09 | 1219 |
| Group 11 | 10% | 20% | 10% | 15.49 | 42.58 | 1206 |
| Group 12 | 10% | 20% | 10% | 15.69 | 42.95 | 1208 |
| Group 13 | 30% | 20% | 10% | 14.88 | 44.34 | 1195 |
| Group 14 | 40% | 30% | 30% | 14.05 | 47.21 | 1189 |
| Group 15 | 0 | 20% | 10% | 14.53 | 38.12 | 1193 |
| Group 16 | 0 | 0 | 0 | 17.20 | 39.64 | 1275 |
| Group 17 | 0 | 10% | 0 | 16.73 | 41.18 | 1249 |
| Group 18 | 0 | 20% | 10% | 16.40 | 43.58 | 1251 |
| Group 19 | 0 | 20% | 10% | 15.98 | 44.12 | 1210 |
| Group 20 | 10% | 30% | 10% | 15.12 | 45.11 | 1209 |
| Group 21 | 20% | 30% | 20% | 14.46 | 48.23 | 1196 |
| Group 22 | 0 | 10% | 10% | 15.33 | 40.54 | 1209 |
| Group 23 | 0 | 0 | 0 | 18.18 | 50.25 | 1326 |
| Group 24 | 0 | 0 | 0 | 18.01 | 44.24 | 1320 |
| Group 25 | 0 | 0 | 0 | 17.53 | 44.62 | 1286 |
| Group 26 | 0 | 10% | 0 | 17.05 | 45.13 | 1263 |
| Group 27 | 10% | 20% | 10% | 16.58 | 45.24 | 1255 |
| Group 28 | 10% | 30% | 20% | 15.61 | 49.17 | 1215 |
| Group 29 | 0 | 10% | 0 | 16.98 | 39.74 | 1235 |
| Group 30 | 0 | 0 | 0 | 17.81 | 40.40 | 1293 |
| Group 31 | 0 | 10% | 0 | 17.41 | 41.23 | 1286 |
| Group 32 | 0 | 10% | 0 | 17.10 | 42.57 | 1277 |
| Group 33 | 10% | 20% | 10% | 16.38 | 43.57 | 1251 |
| Group 34 | 20% | 20% | 10% | 15.86 | 44.78 | 1223 |
| Group 35 | 10% | 30% | 20% | 15.09 | 48.21 | 1208 |

Example 5: Determination of Sintering Shrinkage of Zirconia Ceramics of Example 4

1. The powder formula of each layer of the zirconia ceramic was chosen according to the actual situation of patients, or according to the general needs. In this example, according to the general needs, the formula of group 31 of Example 4 was selected as the occlusal surface formula, and the formula of group 23 of Example 4 was selected as the bridge formula. The coloring agent was added to adjust the color of each group of formulas correspondingly. Because the occlusal surface is required to be lighter in color, 0.3% of coloring agent was added in the occlusal surface formula, and the content of zirconia powder was correspondingly reduced by 0.3%, which was used as the lightest layer formula. 0.5% of coloring agent was added in the bridge formula, and the content of zirconia powder was correspondingly reduced by 0.5%, which was used as the darkest layer formula.

2. Monolithic zirconia ceramics corresponding to the lightest layer formula and monolithic zirconia ceramics corresponding to the darkest layer formula were manufactured using the above formulas, and the shrinkage of zirconia ceramics with the same formula but different particle size distributions of zirconia, yttria and silicon carbide nano-whiskers was measured. With the same formula, the particle size distributions of zirconia, yttria and silicon carbide nano-whiskers in the formula were determined, and the shrinkage under each particle size distribution was measured after isostatic pressing, pre-sintering and high-temperature sintering under the same conditions. The conditions of isostatic pressing, pre-sintering, and high-temperature sintering were the same as those in Example 4. It should be understood that in fact, the particle size distribution was determined with respect to the entire formula. For example, the proportion of 10-50 μm particle size distribution being 70% means that 70% of all the components in the formula have their particle size within the range of 10-50 μm, but does not mean that 70% of a specific component has its particle size within the range of 10-50 μm. For example, for silicon carbide nano-whiskers, the particle size range is actually 50-250 μm rather than 10-50 μm, but it does not affect the fact that there are 70% by mass of powder materials with particle size in the range of 10-50 μm. With different particle size distributions, the shrinkage of zirconia ceramics prepared with the lightest layer formula is shown in Table 8; and the shrinkage of zirconia ceramics prepared with the darkest layer formula is shown in Table 9.

TABLE 8

Shrinkage of the lightest layer formula

| Powder particle size | 10-50 μm | 50-150 μm | 150-300 μm | Shrinkage (%) |
|---|---|---|---|---|
| Content of powders with different particle sizes (%) | 70 | 20 | 10 | 15.72 |
| | 60 | 30 | 10 | 17.82 |
| | 50 | 40 | 10 | 17.45 |
| | 40 | 50 | 10 | 17.75 |
| | 30 | 60 | 10 | 18.66 |
| | 20 | 70 | 10 | 18.69 |
| | 10 | 80 | 10 | 19.12 |
| | 65 | 15 | 20 | 18.03 |

TABLE 8-continued

Shrinkage of the lightest layer formula

| Powder particle size | 10-50 μm | 50-150 μm | 150-300 μm | Shrinkage (%) |
|---|---|---|---|---|
| | 55 | 25 | 20 | 18.26 |
| | 45 | 35 | 20 | 18.91 |
| | 35 | 45 | 20 | 18.99 |
| | 25 | 55 | 20 | 19.25 |
| | 15 | 65 | 20 | 20.01 |
| | 60 | 10 | 30 | 19.01 |
| | 50 | 20 | 30 | 19.36 |
| | 40 | 30 | 30 | 19.65 |
| | 30 | 40 | 30 | 19.91 |
| | 20 | 50 | 30 | 20.23 |
| | 10 | 60 | 30 | 20.55 |
| | 50 | 10 | 40 | 20.15 |
| | 40 | 20 | 40 | 20.21 |
| | 30 | 30 | 40 | 20.93 |
| | 20 | 40 | 40 | 20.15 |
| | 10 | 50 | 40 | 21.03 |

TABLE 9

Shrinkage of the darkest layer formula

| Powder particle size | 10-50 μm | 50-150 μm | 150-300 μm | Shrinkage (%) |
|---|---|---|---|---|
| Content of powders with different particle sizes (%) | 70 | 20 | 10 | 17.45 |
| | 60 | 30 | 10 | 17.82 |
| | 50 | 40 | 10 | 18.15 |
| | 40 | 50 | 10 | 18.76 |
| | 30 | 60 | 10 | 19.01 |
| | 20 | 70 | 10 | 19.58 |
| | 10 | 80 | 10 | 19.69 |
| | 65 | 15 | 20 | 19.50 |
| | 55 | 25 | 20 | 19.13 |
| | 45 | 35 | 20 | 19.48 |
| | 35 | 45 | 20 | 19.48 |
| | 25 | 55 | 20 | 19.36 |
| | 15 | 65 | 20 | 20.55 |
| | 60 | 10 | 30 | 19.08 |
| | 50 | 20 | 30 | 20.53 |
| | 40 | 30 | 30 | 20.16 |
| | 30 | 40 | 30 | 20.98 |
| | 20 | 50 | 30 | 20.66 |
| | 10 | 60 | 30 | 21.06 |
| | 50 | 10 | 40 | 20.05 |
| | 40 | 20 | 40 | 20.15 |
| | 30 | 30 | 40 | 20.60 |
| | 20 | 40 | 40 | 20.88 |
| | 10 | 50 | 40 | 21.03 |

3. The lightest layer formula and the darkest layer formula were adjusted to have consistent shrinkage (the maximum shrinkage difference of <3‰ is considered to indicate consistent shrinkage). The particle size distributions with the same shrinkage of 17.45%, 17.82%, 19.01%, and 20.55% were selected to prepare four groups (namely, groups 1, 2, 3 and 4) of powder formulas of zirconia ceramics, with three replicates for each group. Take the shrinkage of 17.45% as an example. That is, in the lightest layer formula, the particle size distribution of the powder was as follows: 10-50 μm, accounting for 50%; 50-150 μm, accounting for 40%; and 150-300 μm, accounting for 10%. In the darkest layer formula, the particle size distributions of zirconia and yttria were as follows: 10-50 μm, accounting for 70%; 50-150 μm, accounting for 20%; and 150-300 μm, accounting for 10%. The particle size distributions of the remaining groups are similar and will not be described again.

4. The formula of the transition layer was determined according to the adjusted lightest layer formula and darkest layer formula. The mass ratios of the transition layers in these groups were 2:1, 3:2, 1:1, 2:3 and 1:2 of the lightest layer to the darkest layer, respectively, and the lightest layer formula and the darkest layer formula were uniformly mixed to obtain the transition layer formulas 1, 2, 3, 4 and 5, respectively. Because the maximum difference in shrinkage between the lightest layer and the darkest layer was determined, the difference in sintering shrinkage between the prepared transition layer and each of the lightest layer and the darkest layer cannot exceed the determined values, thereby ensuring consistent shrinkage of the finally obtained layered zirconia ceramic.

5. The various layers of powder materials were sequentially placed or deposited in the order of the lightest layer, the transition layer 1, the transition layer 2, the transition layer 3, the transition layer 4, the transition layer 5 and the darkest layer, and isostatic pressing, pre-sintering and high-temperature sintering were carried out according to the method of step 2 to obtain the zirconia ceramics of each group. The difference in shrinkage between zirconia ceramics was measured, and transition of translucency and color was visually observed. The results are shown in Table 10.

TABLE 10

Effects in all the groups

| Group | Maximum shrinkage difference | Translucency and color transition | Edge chipping rate in machining (%) | Edge chipping rate in high-temperature sintering (%) |
|---|---|---|---|---|
| Group 1 | <1‰ | Uniform transition, no discontinuity in translucency and color | 0 | 0 |
| Group 2 | <2‰ | Uniform transition, no discontinuity in translucency and color | 0 | 0 |
| Group 3 | <2‰ | Uniform transition, no discontinuity in translucency and color | 0 | 0 |
| Group 4 | <2‰ | Uniform transition, no discontinuity in translucency and color | 0 | 0 |

Example 6: Demonstration of Effect of High-Temperature Sintering Process

1. Group 1 of Example 5 was selected to set 21 groups of layered zirconia powder formulas, with 10 replicates for each group. The layers of powder were sequentially placed or deposited and subjected to isostatic pressing, pre-sintering, and machining in the same manner as in Example 5, followed by high-temperature sintering as described in Table 11.

TABLE 11

Parameters of high-temperature sintering process for all the groups

| Group | First heating rate (° C./min) | First heating interval (° C.) | First holding time (min) | Second heating rate (° C./min) | Second heating interval (° C.) | Third heating rate (° C./min) | Third heating interval (° C.) | Third holding time (min) | Cooling rate (° C./min) | Cooling interval (° C.) |
|---|---|---|---|---|---|---|---|---|---|---|
| Group 1 | 3 | 20-200 | 10 | 10 | 200-1000 | 5 | 1000-1530 | 120 | 5 | 1530-800 |
| Group 2 | 5 | 20-200 | 10 | 10 | 200-1000 | 5 | 1000-1530 | 120 | 5 | 1530-800 |
| Group 3 | 8 | 20-200 | 10 | 10 | 200-1000 | 5 | 1000-1530 | 120 | 5 | 1530-800 |
| Group 4 | 5 | 20-350 | 10 | 10 | 200-1000 | 5 | 1000-1530 | 120 | 5 | 1530-800 |
| Group 5 | 5 | 20-200 | 20 | 10 | 200-1000 | 5 | 1000-1530 | 120 | 5 | 1530-800 |
| Group 6 | 5 | 20-200 | 10 | 5 | 200-1000 | 5 | 1000-1530 | 120 | 5 | 1530-800 |
| Group 7 | 5 | 20-200 | 10 | 20 | 200-1000 | 5 | 1000-1530 | 120 | 5 | 1530-800 |
| Group 8 | 5 | 20-200 | 10 | 10 | 200-800 | 5 | 800-1530 | 120 | 5 | 1530-800 |
| Group 9 | 5 | 20-200 | 10 | 10 | 200-1300 | 5 | 1300-1530 | 120 | 5 | 1530-800 |
| Group 10 | 5 | 20-200 | 10 | 10 | 200-1000 | 2 | 1000-1530 | 120 | 5 | 1530-800 |
| Group 11 | 5 | 20-200 | 10 | 10 | 200-1000 | 10 | 1000-1530 | 120 | 5 | 1530-800 |
| Group 12 | 5 | 20-200 | 10 | 10 | 200-1000 | 5 | 1000-1480 | 120 | 5 | 1480-800 |
| Group 13 | 5 | 20-200 | 10 | 10 | 200-1000 | 5 | 1000-1500 | 120 | 5 | 1500-800 |
| Group 14 | 5 | 20-200 | 10 | 10 | 200-1000 | 5 | 1000-1550 | 120 | 5 | 1550-800 |
| Group 15 | 5 | 20-200 | 10 | 10 | 200-1000 | 5 | 1000-1530 | 60 | 5 | 1530-800 |
| Group 16 | 5 | 20-200 | 10 | 10 | 200-1000 | 5 | 1000-1530 | 90 | 5 | 1530-800 |
| Group 17 | 5 | 20-200 | 10 | 10 | 200-1000 | 5 | 1000-1530 | 180 | 5 | 1530-800 |
| Group 18 | 5 | 20-200 | 10 | 10 | 200-1000 | 5 | 1000-1530 | 120 | 2 | 1530-800 |
| Group 19 | 5 | 20-200 | 10 | 10 | 200-1000 | 5 | 1000-1530 | 120 | 10 | 1530-800 |
| Group 20 | 5 | 20-200 | 10 | 10 | 200-1000 | 5 | 1000-1530 | 120 | 5 | 1530-1000 |
| Group 21 | 5 | 20-200 | 10 | 10 | 200-1000 | 5 | 1000-1530 | 120 | 5 | 1530-500 |

2. The flexural strength of the zirconia ceramics prepared in each group was measured, and the edge chipping rate of the zirconia ceramics in each group during high-temperature sintering was observed. The transition in translucency and color of the zirconia ceramics in each group was also observed. The results are shown in Table 12.

TABLE 12

Performance of zirconia ceramics in all the groups

| Group | Flexural strength MPa | Edge chipping rate (%) | Translucency and color transition |
|---|---|---|---|
| Group 1 | 1328 | 0 | Uniform transition, no discontinuity in translucency and color |
| Group 2 | 1325 | 0 | Uniform transition, no discontinuity in translucency and color |
| Group 3 | 1108 | 10 | Uniform transition, no discontinuity in translucency and color |
| Group 4 | 1123 | 10 | Uniform transition, no discontinuity in translucency and color |
| Group 5 | 1025 | 0 | Uniform transition, no discontinuity in translucency and color |
| Group 6 | 1323 | 0 | Uniform transition, no discontinuity in translucency and color |
| Group 7 | 952 | 30 | Uniform transition, no discontinuity in translucency and color |
| Group 8 | 1321 | 0 | Uniform transition, no discontinuity in translucency and color |
| Group 9 | 1121 | 20 | Uniform transition, no discontinuity in translucency and color |
| Group 10 | 1326 | 0 | Uniform transition, no discontinuity in translucency and color |
| Group 11 | 872 | 30 | Uniform transition, no discontinuity in translucency and color |
| Group 12 | 1021 | 0 | Uniform transition, no discontinuity in translucency and color |
| Group 13 | 1019 | 0 | Uniform transition, no discontinuity in translucency and color |
| Group 14 | 998 | 0 | Uniform transition, no discontinuity in translucency and color |
| Group 15 | 768 | 0 | Uniform transition, no discontinuity in translucency and color |
| Group 16 | 864 | 0 | Uniform transition, no discontinuity in translucency and color |
| Group 17 | 1214 | 0 | Uniform transition, no discontinuity in translucency and color |
| Group 18 | 1326 | 0 | Uniform transition, no discontinuity in translucency and color |
| Group 19 | 732 | 40 | Uniform transition, no discontinuity in translucency and color |
| Group 20 | 1324 | 0 | Uniform transition, no discontinuity in translucency and color |
| Group 21 | 1035 | 0 | Uniform transition, no discontinuity in translucency and color |

What is claimed is:

1. A method of preparing a zirconia ceramic, comprising:
   (1) weighing, in percentage by mass, 0-3% of lanthana, 1.5-16% of yttria, 0-2.5% of silicon carbide, and a balance of zirconia, and mixing them to obtain a first mixed powder, wherein the silicon carbide has a particle size range of 50-250 μm;
   (2) pre-pressing, isostatic pressing, and pre-sintering the first mixed powder to obtain the zirconia ceramic;
   (3) providing a Ti-coated zirconia ceramic after pre-sintering is completed by cooling, cleaning, drying and coating the zirconia ceramic with Ti; and
   (4) sintering the Ti-coated zirconia ceramic in an $N_2$ atmosphere, at a a at a high temperature of 1530° C. with a hold of 60-180 min.

2. The method according to claim 1, further comprising, before coating the zirconia ceramic with Ti, sputter-cleaning the dried zirconia ceramic using an ion beam.

3. The method according to claim 2, wherein the ion beam has an energy of 300 eV and a current of 50 mA.

4. The method according to claim 1, further comprising preparing at least one second mixed powder, the at least one second mixed powder being different from the first mixed powder, and laminating, isostatic pressing, and pre-sintering each of the first and second mixed powders to form multi-layer zirconia ceramics;
   wherein each of the first and second mixed powders has a particle size distribution, an yttria content and a silicon carbide content such that a maximum difference in shrinkage of the zirconia ceramics during high-temperature sintering is <3‰.

5. The method according to claim 4, wherein:
   (1) preparing the first and second mixed powders comprises determining respective contents of raw material components in each of an uppermost layer and a lowermost layer of the multilayer zirconia ceramics according to desired properties for the multilayer zirconia ceramics, and forming at least one transition layer from parts of the uppermost layer and the lowermost layer; and
   (2) the uppermost layer, the at least one transition layer and the lowermost layer are sequentially laminated, isostatically pressed, pre-sintered and sintered to obtain the multilayer zirconia ceramics.

6. The method according to claim 5, wherein when the uppermost layer and the lowermost layer have different colors, the first and second mixed powders further contain a coloring agent in a percentage by mass of 0.1-1.5%; and when the uppermost layer and the lowermost layer have different translucencies, the percentage by mass of yttria in the uppermost layer is greater than the percentage by mass of yttria in the lowermost layer.

7. The method according to claim 5, wherein the at least one transition layer comprises 2 to 5 transition layers.

8. The method according to claim 7, wherein the at least one transition layer comprises 5 transition layers, and the 5 transition layers include the parts of the uppermost layer and the lowermost layer in respective mass ratios of 2:1, 3:2, 1:1, 2:3, and 1:2.

9. The method according to claim 4, wherein the first and second mixed powders provide one or more different colors, translucencies and/or mechanical properties to the uppermost layer and the lowermost layer.

10. The method according to claim 4, wherein the sintering comprises heating the first and second mixed powders to 200° C. at a rate of 3-6° C./min, and holding at this temperature for 8-12 min; then heating the first and second mixed powders from 200° C. to 1000° C. at a rate of 8-25° C./min; heating the first and second mixed powders from 1000° C. to 1530° C. at a rate of 3-6° C./min, and holding at this temperature for 60-180 min; then cooling the first and second mixed powders from 1530° C. to 1200° C. or to 800° C. at a rate of 3-10° C./min.

11. The method according to claim 10, comprising preparing dentures with a 1-3 unit long bridge, wherein heating the first and second mixed powders from 200° C. to 1000° C. is conducted at a rate of 16-25° C./min; and the at least two different mixed powders are cooled from 1530° C. to 1200° C. at a rate of 6-10° C./min.

12. The method according to claim 10, comprising preparing dentures with a 4-7 unit long bridge, wherein heating the first and second mixed powders from 200° C. to 1000° C. is conducted at a rate of 8-12° C./min; and the at least two different mixed powders are cooled from 1530° C. to 1200° C. at a rate of 6-10° C./min.

13. The method according to claim 10, comprising preparing dentures with an 8-14 unit long bridge, wherein heating the first and second mixed powders from 200° C. to 1000° C. is conducted at a rate of 8-12° C./min; and the at least two different mixed powders are cooled from 1530° C. to 800° C. at a rate of 3-6° C./min.

14. The method according to claim 1, wherein the sintering further comprises cooling the sintered, Ti-coated zirconia ceramic to room temperature.

15. The method according to claim 1, wherein the sintering is conducted for a total time of 288-418 min.

16. The method according to claim 1, wherein the titanium nitride film on the surface of the zirconia ceramic has a thickness of 100-200 nm.

17. The method according to claim 1, wherein coating the zirconia ceramic with Ti forms a Ti coating on a surface of the zirconia ceramic.

18. The method according to claim 17, wherein coating the zirconia ceramic with Ti comprises coating the zirconia ceramic with 99.99% pure Ti in an Ar atmosphere using an electron beam evaporation coating machine with an electron beam current of 100 mA and an energy of 7 kV.

19. The method according to claim 1, wherein 0.5-2.5% by mass of silicon carbide is weighed and mixed to obtain the first mixed powder.

* * * * *